US011709245B2

United States Patent
Droitcour et al.

(10) Patent No.: US 11,709,245 B2
(45) Date of Patent: Jul. 25, 2023

(54) SYSTEM AND METHODS FOR RADAR-BASED DETECTION OF PEOPLE IN A ROOM

(71) Applicants: Amy Diane Droitcour, Arlington, MA (US); Ehsan Yavari, Honolulu, HI (US); Chenyan Song, Honolulu, HI (US)

(72) Inventors: Amy Diane Droitcour, Arlington, MA (US); Ehsan Yavari, Honolulu, HI (US); Chenyan Song, Honolulu, HI (US)

(73) Assignee: Adnoviv Inc., Honolulu, HI (US)

( * ) Notice: Subject to any disclaimer, the term of this patent is extended or adjusted under 35 U.S.C. 154(b) by 209 days.

(21) Appl. No.: 16/857,505

(22) Filed: Apr. 24, 2020

(65) Prior Publication Data

US 2021/0103044 A1    Apr. 8, 2021

Related U.S. Application Data

(60) Provisional application No. 62/840,017, filed on Apr. 29, 2019.

(51) Int. Cl.
| | |
|---|---|
| *G01S 13/56* | (2006.01) |
| *G01S 13/04* | (2006.01) |
| *G01S 13/58* | (2006.01) |
| *G01S 13/86* | (2006.01) |

(52) U.S. Cl.
CPC .............. *G01S 13/56* (2013.01); *G01S 13/04* (2013.01); *G01S 13/581* (2013.01); *G01S 13/86* (2013.01)

(58) Field of Classification Search
CPC ........ G01S 13/56; G01S 13/04; G01S 13/581; G01S 13/86
USPC ........................................................... 342/28
See application file for complete search history.

(56) References Cited

U.S. PATENT DOCUMENTS

| | | | | |
|---|---|---|---|---|
| 3,967,283 A | * | 6/1976 | Clark ..................... | G01S 13/56 342/28 |
| 5,249,122 A | * | 9/1993 | Stritzke ................. | G16H 50/50 600/431 |
| 5,341,142 A | * | 8/1994 | Reis ...................... | F41G 7/2293 342/63 |
| 6,411,250 B1 | * | 6/2002 | Oswald ............... | G01S 13/0209 342/159 |
| 6,888,493 B2 | * | 5/2005 | Driessen ................ | G01S 13/42 342/91 |

(Continued)

FOREIGN PATENT DOCUMENTS

| | | | | |
|---|---|---|---|---|
| DE | 102005063629 B4 | * | 4/2021 | ............. G01S 13/34 |
| WO | WO-2019026076 A1 | * | 2/2019 | ........... A61B 5/0205 |

*Primary Examiner* — Nuzhat Pervin
(74) *Attorney, Agent, or Firm* — Plager Schack LLP; Mark H. Plager; Alexis J. Saenz

(57) ABSTRACT

A method and system improve on the accuracy of detecting the presence of people in a room. Aspects of the embodiments may be used for occupancy sensors by monitoring occupant physiological movements. In an embodiment, a Doppler radar sensor may be used to measure the occupant-related physiological signals, calculate the Riemann integral (RI) of the occupants' cardiopulmonary movement displacement, body movement index (BMI), and amplitude difference accumulation (ADA) of the body movement. A determination for detection of occupants may be by adaptive thresholding.

9 Claims, 8 Drawing Sheets

(56) References Cited

U.S. PATENT DOCUMENTS

| | | | |
|---|---|---|---|
| 8,725,311 B1* | 5/2014 | Breed | A61B 5/11 701/1 |
| 9,097,801 B2* | 8/2015 | Kambe | G01S 13/931 |
| 9,375,145 B2* | 6/2016 | Chin | A61B 5/0015 |
| 9,699,663 B1* | 7/2017 | Jovancevic | H04L 27/0006 |
| 9,755,850 B2* | 9/2017 | Stolfus | G08G 1/096844 |
| 9,993,166 B1* | 6/2018 | Johnson | A61B 5/0022 |
| 10,361,680 B2* | 7/2019 | Xie | H03H 17/0219 |
| 10,378,904 B2* | 8/2019 | Fink | G06F 17/10 |
| 2004/0027274 A1* | 2/2004 | Driessen | G01S 13/726 342/107 |
| 2004/0042531 A1* | 3/2004 | Arikan | H04B 1/7115 375/150 |
| 2007/0096445 A1* | 5/2007 | Breed | B60R 21/01516 280/801.1 |
| 2010/0240999 A1* | 9/2010 | Droitcour | A61B 5/7203 600/453 |
| 2010/0249630 A1* | 9/2010 | Droitcour | G01S 13/88 607/42 |
| 2010/0249633 A1* | 9/2010 | Droitcour | A61B 5/7203 600/534 |
| 2010/0292568 A1* | 11/2010 | Droitcour | G01S 13/56 600/425 |
| 2011/0032139 A1* | 2/2011 | Benitez | G01S 13/56 342/28 |
| 2011/0157366 A1* | 6/2011 | Padmanabh | G08B 5/221 348/E7.085 |
| 2012/0299733 A1* | 11/2012 | Knibbe | H05B 47/13 340/573.1 |
| 2013/0009555 A1* | 1/2013 | Murakami | G01S 13/86 315/159 |
| 2013/0193847 A1* | 8/2013 | Recker | H05B 47/28 315/86 |
| 2015/0309167 A1* | 10/2015 | Shikatani | G01S 13/18 342/27 |
| 2017/0123058 A1* | 5/2017 | Yavari | G01S 13/86 |
| 2019/0033458 A1* | 1/2019 | Ten Kate | G08B 13/191 |
| 2019/0087645 A1* | 3/2019 | Agarwal | G06V 40/172 |
| 2019/0087646 A1* | 3/2019 | Goulden | G08B 3/10 |
| 2020/0300990 A1* | 9/2020 | Eichenholz | G01S 7/4865 |
| 2021/0041953 A1* | 2/2021 | Poltorak | A61B 5/377 |
| 2021/0293948 A1* | 9/2021 | Peng | G01S 7/354 |

* cited by examiner

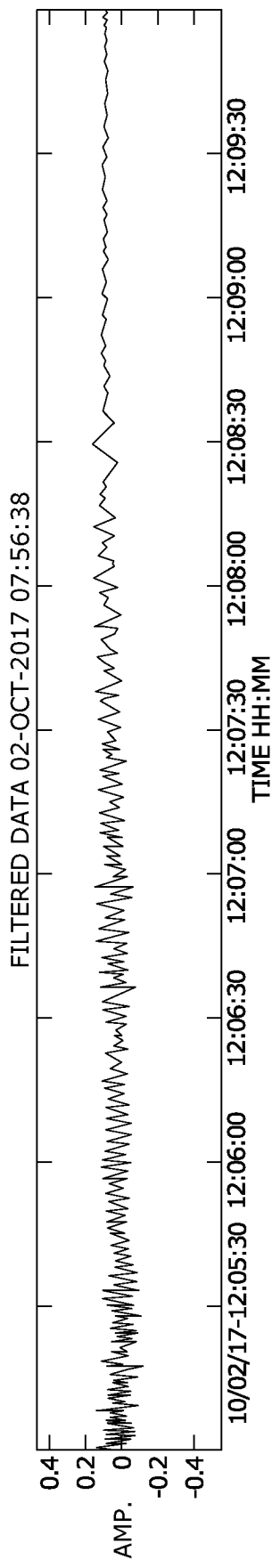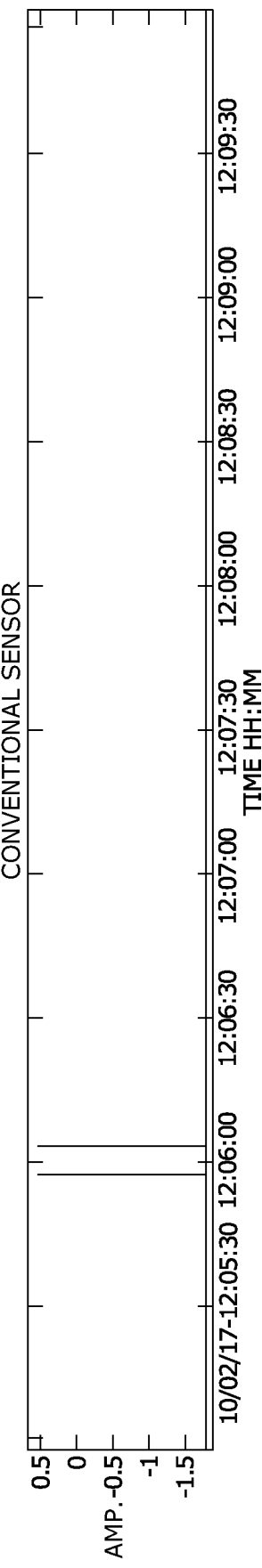

SYSTEM AND METHODS FOR RADAR-BASED DETECTION OF PEOPLE IN A ROOM

CROSS-REFERENCE TO RELATED APPLICATIONS

This application claims benefit under 35 U.S.C. § 119(e) of U.S. Provisional Application having Ser. No. 62/840,017 filed Apr. 29, 2019, which is hereby incorporated by reference herein in its entirety.

BACKGROUND

The embodiments herein relate generally to detection systems, and more particularly, to systems and methods for radar-based detection of people in a room.

Commonly used occupancy sensors do not adequately detect presence of sedentary people, who are reading or typing. This mis-detection can lead to lights and HVAC switching off while a room is occupied. Because of this annoyance, users often either disable the occupancy sensors or use them with very long time delays, and the energy savings are less than they could be with a more accurate occupancy sensor.

Other radar-based occupancy sensors can have false readings from fans or moving curtains. Other radar-based sensors only provide determination of presence or vacancy and do not provide information on activity level. Other radar-based occupancy sensors have demanding processing that cannot run in real-time on a simple processor. Other radar-based sensors do not provide an accurate determination of presence or vacancy in some situations, including situations in which the environment is changing. Other radar-based sensors do not operate in a concealed mode behind a wall.

In Doppler radar occupancy sensing technology, a Doppler radar transceiver performs the sensing function. The radar transceiver transmits a radio wave signal and receives a motion-modulated signal reflected from a target. The RF wave reflected at a moving surface undergoes a frequency shift proportional to the surface velocity. If the surface is moving periodically, for example, when a person's chest moves due to breathing and heart beating, this can be characterized as a phase shift proportional to the surface displacement. If the movement is small compared to the wavelength, a circuit that couples both the transmitted and reflected waves to a mixer can produce an output signal with a low-frequency component that is directly proportional to the movement. Therefore, Doppler radar is now being used for vital sign detection making it a viable option for not only medical application, but also occupancy detection.

In recent work, Doppler radar's capacity to detect a mechanical and human target at various locations in a closed space over noise was studied. Using Doppler radar in conjunction with RMS processing can distinguish motion from noise in some cases. There is a need to improve on systems that detect the presence of people in a room.

SUMMARY

In one aspect of the subject technology, a computer program product for detecting the presence of a person in a room comprising a non-transitory computer readable storage medium having computer readable program code is disclosed. The computer readable program code is configured, when executed by a processing unit, to: set a threshold level of a signal indicating body movement in the room; receive a RADAR-based signal from a RADAR sensor in the room; determine a Riemann integral (RI) value for a sampling of data from the RADAR-based signal; determine whether the RI value over a first time window exceeds the threshold level; in the event the RI value exceeds the threshold level, determine that the room is occupied and send a turn on signal to a controller to turn on an environmental load or maintain the environment load on in the room; and in the event the RI value does not exceed the threshold level, determine that the room is vacant and send a turn off signal to the controller to turn off the environmental load.

In another aspect, a method for detecting the presence of a person in a room, comprises: setting a threshold level of a signal indicating body movement in the room; receive a RADAR based signal from a RADAR sensor in the room; determining a Riemann integral (RI) value for a sampling of data from the RADAR-based signal; determining whether the RI value over a first time window exceeds the threshold level; in the event the RI value exceeds the threshold level, determining that the room is occupied and sending a turn on signal to a controller to turn on an environmental load or maintaining the environment load on in the room; and in the event the RI value does not exceed the threshold level, determining that the room is vacant and sending a turn off signal to the controller to turn off the environmental load.

BRIEF DESCRIPTION OF THE FIGURES

The detailed description of some embodiments of the invention is made below with reference to the accompanying figures, wherein like numerals represent corresponding parts of the figures.

FIG. 9A is a plot of data generated in a room with a moving fan by embodiments of the subject technology.

FIG. 9B is a plot of data generated in a room with a moving fan by a conventional sensor system.

DETAILED DESCRIPTION OF CERTAIN EMBODIMENTS

Broadly, embodiments of the subject technology provide a system and method of detecting the presence of people in a room by leveraging the use of a Riemann integral (RI) of the occupants' cardiopulmonary movement displacement, a body movement index (BMI), and an amplitude difference accumulation (ADA) of the body movement to determine the presence of occupants. This method can greatly enhance the resolution of information extracted from RADAR return and hence increases accuracy in occupancy detection.

Figure 1:
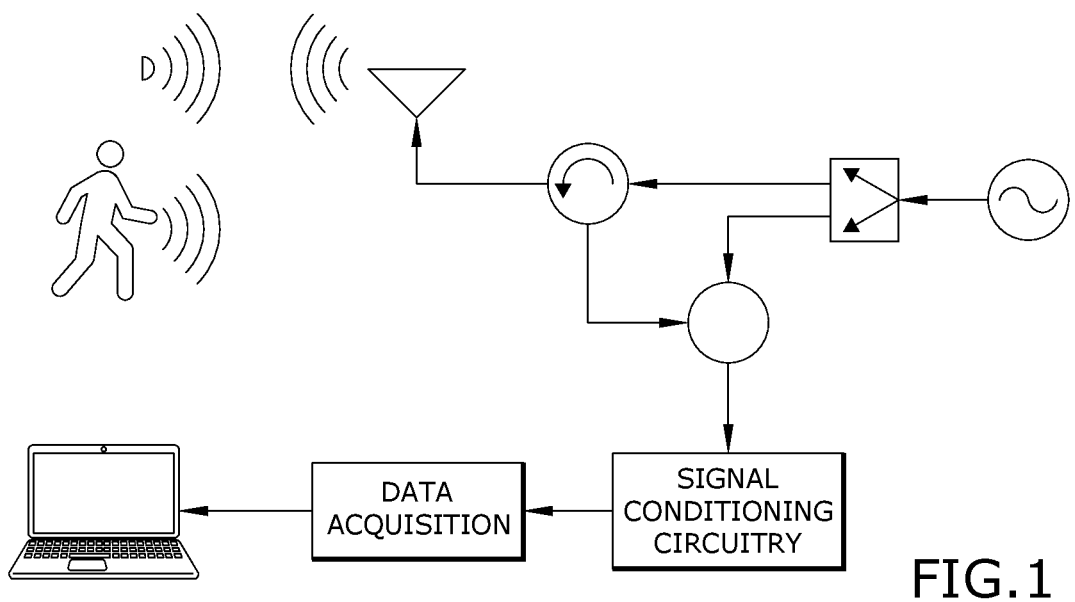
FIG. 1 is a block diagram of a system for detecting the presence of a person in a room in accordance with embodiments of the subject technology.
Figure 2A:
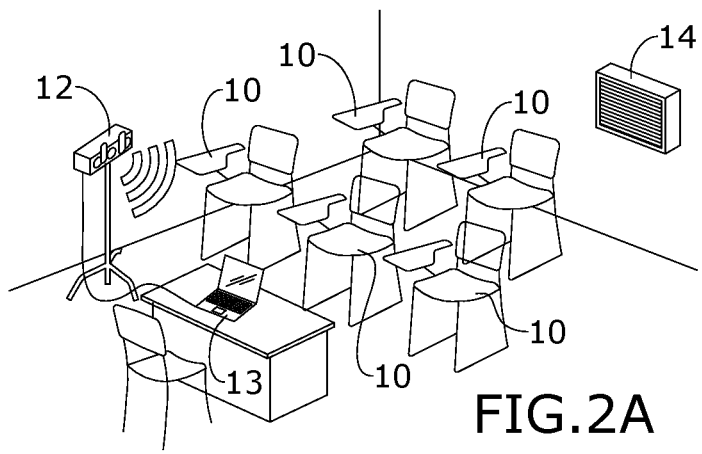
FIG. 2A is an illustration of a room filled with objects but unoccupied, monitored by the system of FIG. 8 in accordance with embodiments of the subject technology.
Figure 2B:
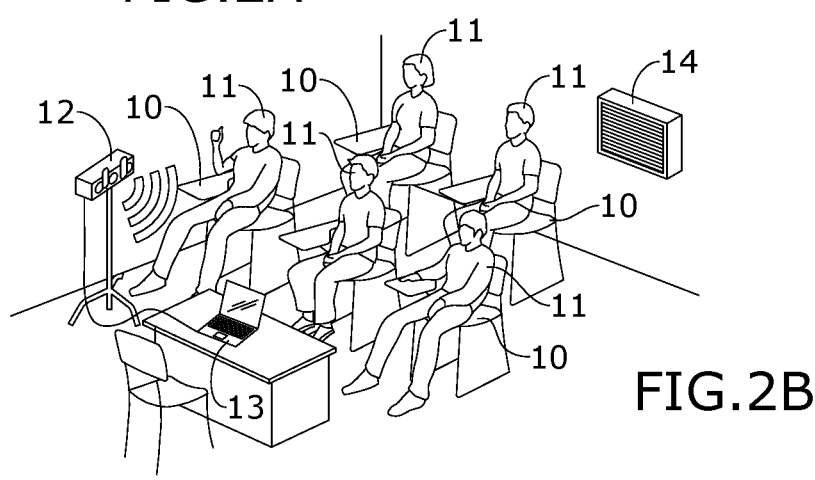
FIG. 2B is the room of FIG. 2A but occupied by people and monitored by the system of FIG. 1 in accordance with embodiments of the subject technology.

Referring to FIG. 1, a system for detecting the presence of a person in a room is shown according to an exemplary embodiment. The system may include a Doppler Radar transceiver which may be positioned in a room. The transceiver may include an antenna connected to a radio signal source, a mixer to demodulate the received signal, and a circuit configured to condition signals received by the antenna for data acquisition and subsequent analysis. The digitized signals may be provided to a computing device which may include a processing unit configured to analyze the data for occupancy. FIGS. 2A and 2B show an example of an environment where embodiments of the subject technology may be practiced. FIG. 2A shows a classroom that includes a plurality of unoccupied desks 10. A Doppler based RADAR sensor system 12 is positioned in a location that can scan the room with a RADAR signal. The data acquired by the RADAR sensor system 12 is communicated to a computing device 13 that may be include a software embodiment that executes the processes for determining whether the signals from the RADAR sensor system 12 indicate whether the room is in an occupied or a vacant state. The RADAR sensor system 12 and computing device 13 represent the system shown in FIG. 1. In an exemplary application, element 14 is an environmental load whose operation may be controlled by the software. In the example shown, element 14 is a fan of an HVAC system. FIG. 2A represents a room determined to be in the vacant state and thus, the environmental load 14 is kept off. FIG. 2B is similar to FIG. 2A except that the desks 10 are occupied by persons 11. Based on the processes disclosed below, the software will determine the presence of a person(s) 11 in the room and may thus control the environmental load 14 to turn on or maintain itself on as long as the room is in the occupied state.

In an exemplary operation, the transmitter generates a radio signal and sends it to the antenna. The radio signal reflects off objects in the room and a portion of the reflected signal returns to the antenna. The signal travels from the antenna to the receiver circuitry, where it is demodulated, conditioned, and digitized. The digitized signal is sent to the processing unit where software processes analyze the digitized signal to determine occupancy or vacancy. The processing unit sends information about the occupancy/vacancy determination via communications and/or control circuitry such that it can be used in applications. In some embodiments, the information about occupancy may be stored in memory resident on the computing device for future use. In some embodiments, the system may be controlled by firmware running on the processing unit and may turn on/off other components. The software and firmware may be stored in the system memory. In some embodiments, values from a temperature sensor may be used to set threshold levels. In some embodiments, values from a light sensor may be used to make lighting control decisions for lights connected to a controller receiving information about the occupancy state of the room.

The determination of the presence or absence of gross body motion may be done by comparing the RMS power to a threshold (adaptive or not).

Adaptive thresholding may be based on a level crossing process discussed in further detail below. The threshold for level crossing may be based on the local maximum values and/or the local minimum values of the signal. In some embodiments, a calibration at the beginning of the installation may determine a baseline for a threshold value and the threshold value level may be adjusted later based on an average of data received and a standard deviation for the data. Thresholds may in some embodiments be set based on the temperature in the room, measured by a temperature sensor. Thresholds may be set based on the signal amplitude to account for environmental changes including the presence of ceiling fans, and to correct for factors that impact signal power such as distance, angle, etc. In embodiments where the RADAR system has multiple antennas, and the angle to the subject can be estimated by the phase differences in the received signals, the threshold may be set based on the estimated angle.

Figure 3:
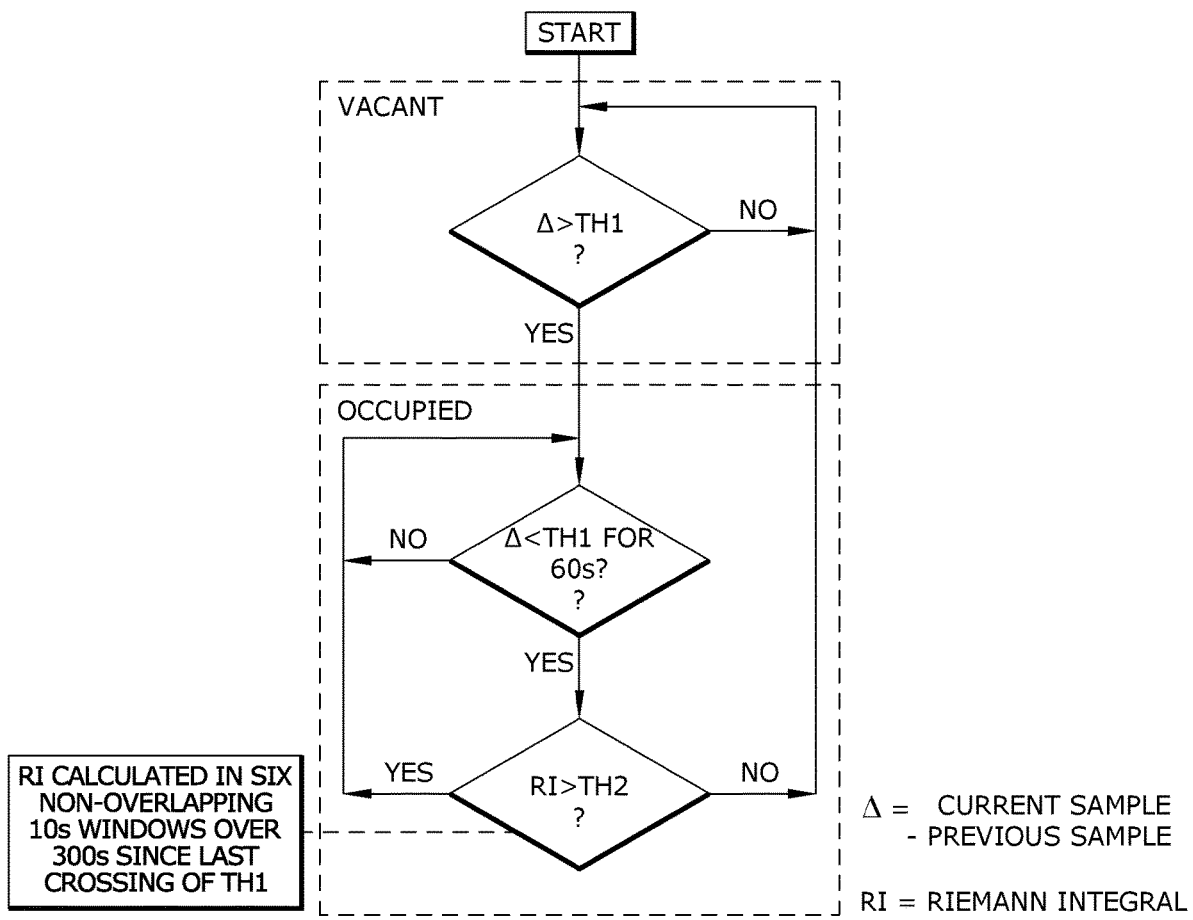
FIG. 3 is a flowchart of a method for determining whether measurements indicate an occupied state of a room in accordance with an embodiment of the subject technology.

Referring now to FIG. 3, a process for periodically determining vacant and occupied states of a room is shown according to an exemplary embodiment. In an exemplary embodiment, a Riemann integral may be calculated and compared to threshold levels to determine the vacant or occupied status of a room under monitor. Raw data is acquired and may be conditioned continually. The system may initially be in a startup process assuming the room is in a vacant state. In the following description, TH1, TH2, TH3, and TH4 are variables which represent the varying thresholds for the RI. For example, TH1 is the threshold for the delta (difference between successive samples). When these are used TH4<=TH3<=TH2. While not shown in the drawings, reference will also be made to time periods T1, T2, and T3. T1, T2, and T3 are variables which represent time periods over which calculations are made.

The system remains in the vacant state until a data sample crosses the threshold TH1. Once the threshold TH1 is crossed, the system may determine the room is in an occupied state. In the occupied state, a signal of "occupancy" is transmitted via the communication circuitry as needed for control of lighting, HVAC, security, or other applications, or the information is stored for later analysis. The system may remain in the occupied state for time period T1 (in some embodiments T1 is 60 s), during which the signal is acquired and recorded. In the occupied state, the Riemann Integral (RI) of the occupants' cardiopulmonary movement displacement signal is calculated over the next period T1. First, the Riemann Integral of the signal is calculated over each period T2<T1 (in some embodiments T2 is 10 s), and it is determined whether the sum of the RIs crosses threshold TH2. If it does, the method indicates the room status remains in an occupied state for another period T1. If not, the method may calculate the percentage of time the RI crosses threshold TH3<TH2 and may calculate the Amplitude Difference Accumulation (ADA) of the signal. If the RI crosses TH3 for a threshold time (for example, at least 33% of the time) and the ADA crosses TH4, the status may return to occupied state for another 60 s. If either of these are not realized, the loads are turned off and the thresholds may be adaptively adjusted, and the system returns to the Vacant State. In some embodiments, the thresholds may be adjusted based on the mean and standard deviation of the signal in the previous period T3>T1.

In some embodiments, the absolute value of the difference between a current sample and the preceding local maxima or local minima may be compared with a threshold TH1, rather than simply comparing the amplitude of the sample with the threshold. In these embodiments, the local minima and local maxima are identified as follows. An initial local maxima MAX_1 is initially identified as the value of the first samples. MAX_1 is redefined as any sample with amplitude greater than the current value of MAX1 until a new local minima MIN1 is identified as a signal that is less than MAX1-TH1. MIN1 is redefined as any lower sample until a new local maxima MAX2 is identified as a signal that is greater than MIN1+TH1. This system iterates to identify a set of local maxima and local minima that set the boundaries of the signal. Each time a new MAX_n or MIN_n is defined or MAX_n or MIN_n is redefined, the occupied State is reset.

In some embodiments the RI is only calculated if a time period T1 passes without a new MAX_n or MIN_n being defined, or MAX_n or MIN_n being redefined. In some embodiments T1 is one minute.

The timing between successive local maxima and local minima pairs (t_MAX_n–t_MAX_(n-1) and t_MIN–t_MIN_(n-1)) may be statistically evaluated to determine the presence or absence of a periodic signal by methods including but not limited to the standard deviation, tests for unimodality, tests for bimodality, skewness, and kurtosis.

A Body Movement Index (BMI) may be used in some embodiments to determine whether there is body movement. This compares each RI (calculated over period T3) to the minimum RI in the period T2.

Amplitude Difference Accumulation (ADA) can be used to determine occupancy or vacancy: over a period T5, the peak points are identified, and the absolute value of the difference in the amplitude of successive peaks in this period are summed.

Activity level can be determined by matching the signal with a reference time series via Euclidean matching. Activity level can be determined by matching the signal with a reference time series via Dynamic time warping.

In an exemplary embodiment, the system may determine physiological signals from the signals received by the antenna. The occupant-related physiological signals, including for example, respiration and body movements, may be measured and recorded by the Doppler radar-based system. The baseband output signal from Doppler radar can be expressed as:

$$x_r(t) = A\cos\left(\frac{2\pi}{\lambda}(2d_0 + 2d(t))\right) \quad (1)$$

where $\lambda$ is the wavelength of the transmitted signal, do is the static distance of radar antenna to the human subject and $d(t)$ represents chest displacement due to heartbeat and respiration, and A is the amplitude of the received signal.

The displacement of the occupant's cardiopulmonary movement relates to the phase in the equation above in the form of:

$$S(t) = \frac{4\pi}{\lambda}d(t). \quad (2)$$

In one embodiment, the sampling rate of the demodulated signal is 100 Hz. We divide the $S(t)$ into continuous non-overlapping windows $S_k$ of 60 seconds. In the k-th window, the Riemann integral $A_k(i)$ of $S_k$, with respect to the 10 second period is defined as:

$$A_k(i) = \Sigma_{t=t_k-i*1000}^{t_k-(i-1)*1000}|S_k|dt \quad (3)$$

where $t_k$ denotes the time of $S_k$. $A_k(i)$ (i=1:6) is calculated every ten seconds. The method reports a body movement if there is a change of more than an order of magnitude in $A_k(i)$.

The Body Movement Index BI(k) may be used to represent the amplitude of body movement, (BMI), which is defined as $$BI(k) = \Sigma_{i=1}^{6} A_k(i) - A_k(i)_{min} \quad (4)$$

where $A_k(i)_{min}$ is the minimum value of $A_k(i)$ $S_k$. $A_k(i)$ at the 60-second interval $S_k$.

Since respiration varies in both amplitude and frequency, amplitude difference accumulation (ADA) may be utilized to distinguish between an occupied and empty room. The ADA in every minute is defined as:

$$ADA(k) = \Sigma_{i=1}^{n} |P_{i+1}^k - P_i^k| \quad (5)$$

where $P_k^i$ denotes the ith peak point in the kth minute, n is the total number of peak points in the kth minute.

Figure 4:
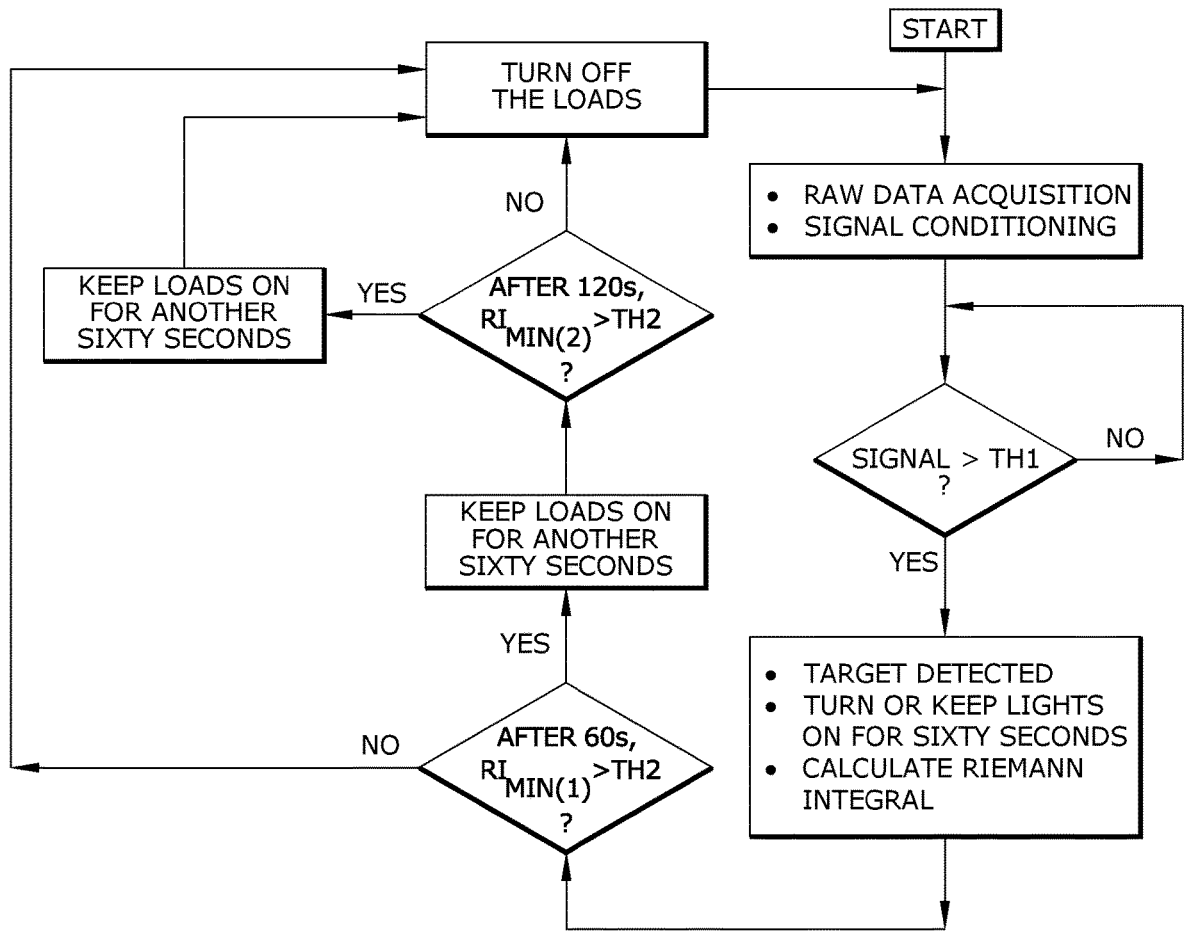
FIG. 4 is a flowchart of a method for detecting the presence of a person in a room in accordance with another embodiment of the subject technology.

Referring now to FIG. 4, a process for determining occupancy is shown according to an exemplary embodiment. The process may use the above-mentioned parameters, RI of occupant's respiration movement ($A_k(i)$ of $S_k$), BMI (BI(k)) and ADA of the body movement.

Figure 10:
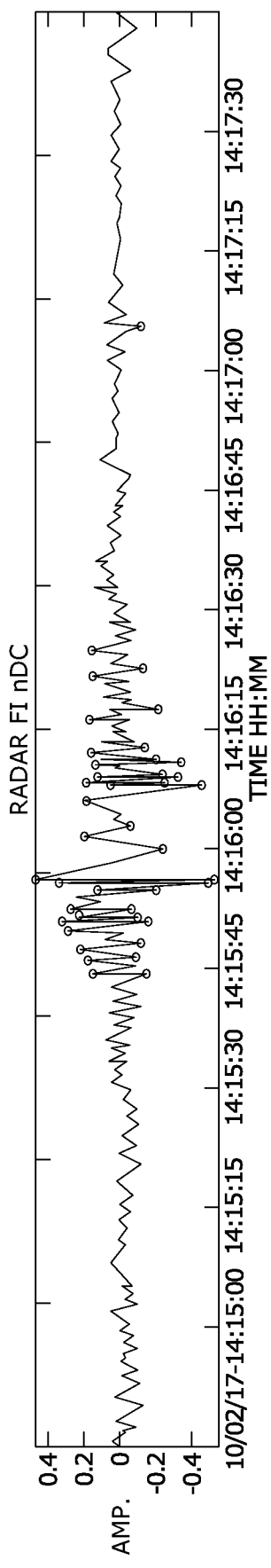
FIG. 10 is a plot of data generated for the room by the system of FIG. 1, showing peak detection of data points in accordance with embodiments of the subject technology.
Figure 11:
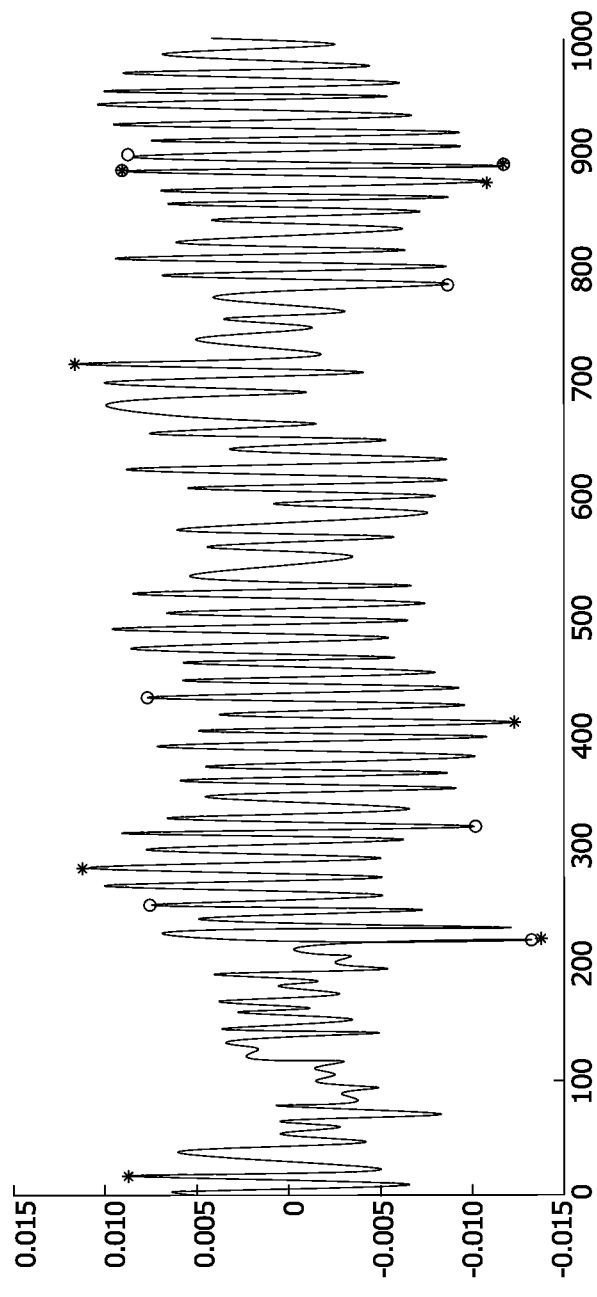
FIG. 11 is a plot of data generated for the room by the system of FIG. 1, showing peak detection of data points in accordance with embodiments of the subject technology.

In an exemplary embodiment, adaptive thresholding may be used for determining occupancy states based on a level crossing sub-process. The threshold level crossing is based on the local maximum values of the signal and the threshold is adaptively updated. FIGS. 10 and 11 show examples of data points with peak detection used for adapting the threshold level used in determining occupancy states. A point is considered a maximum peak if it has a maximum value and was preceded by a value lower by threshold. Referring back to FIG. 4, after data is acquired, data may be filtered, and local maximums are calculated and compared against threshold 1 (TH1) for level crossings. The adaptive threshold helps to consider temperature and other environmental effects or measurement devices variations over time. A calibration at the beginning of the installation would determine a baseline for the threshold, and then the threshold is adjusted later based on average and standard deviation of data. If the threshold level is crossed, the process may determine that a target (person) is detected in the room. An environmental function, (for example, lights, air conditioning, heating) may be turned on (or kept on if previously on) for a pre-set time cycle. As an example, when a target is detected by the system, loads (for example, lights) may be kept on for an additional 60 second cycle until and the process of checking the adaptive threshold is repeated until the data no longer crosses the new threshold level as it is adapted, and then the loads may be turned off. The results may also be stored for later analysis.

Figure 5:
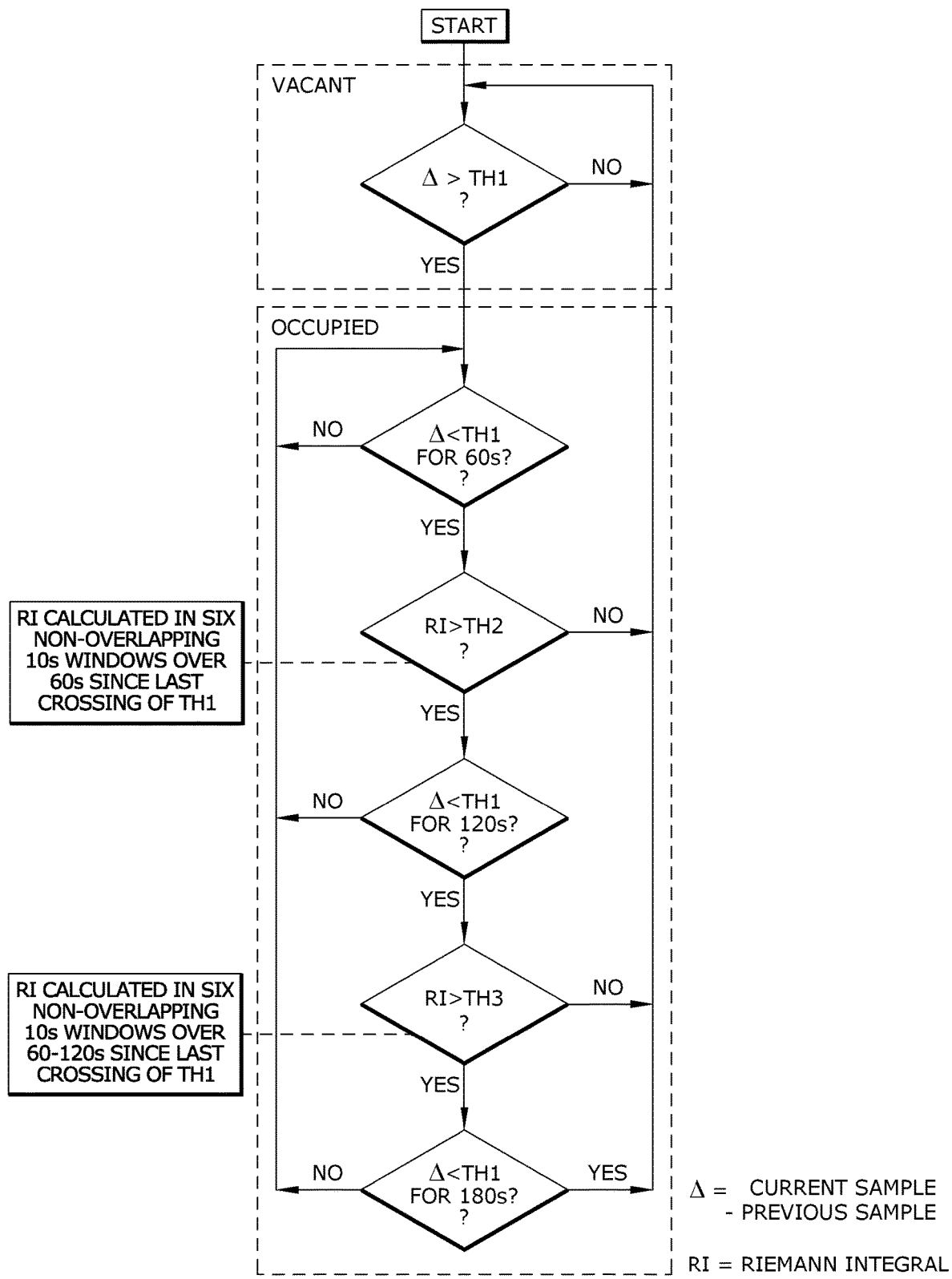
FIG. 5 is a flowchart of a method for detecting the presence of a person in a room in accordance with another embodiment of the subject technology.

Referring now to FIG. 5, a process for periodically determining vacant and occupied states of a room is shown according to another exemplary embodiment. The process of FIG. 5 is similar to the process of FIG. 3, except that the process of FIG. 5 includes thresholds that vary with the time since the last large motion. In the process shown, A represents the absolute value of the amplitude difference between a current sample and the previously calculated local maxima or local minima. In FIG. 5, the process may assume an initially vacant state of the room until the sample amplitude becomes greater than TH1, in which case the process may determine the room is occupied. In the occupied state, the process may check the RI against varying thresholds to determine whether the room remains in the occupied state.

For example, the change in amplitude may be calculated for a first period since the crossing of the first threshold TH1. If the calculated change in amplitude is not less than TH1 then the room may be determined to be occupied. If the change in amplitude is less than the first threshold, then the process may use the RI to determine occupancy. The process may determine whether the RI is greater than the second threshold TH2. The RI may be calculated over multiple non-overlapping windows for a period since the amplitude last crossed the first threshold TH1. In the example shown, the RI is calculated in six non-overlapping ten second intervals for a period of sixty seconds since the last crossing of TH1. If the calculated RI is not greater than TH2, the room may be determined to be vacant. If the RI is greater than threshold TH2, then the process may determine the room to remain occupied and continue to check for a change in the RI over a second (subsequent) period of time since the last crossing of the first threshold. For example, the change in RI may be calculated for one hundred twenty seconds (a subsequent sixty second window) since the amplitude's last crossing of the first threshold TH1. If the change in amplitude over this next period is not less than the first threshold TH1, then the process may determine that the room remains occupied and may reset the occupancy status. If the change in amplitude is not less than the first threshold TH1, then the process may check whether the RI is greater than a third threshold TH3. In checking whether the RI is greater than TH3, the RI may be calculated over the second period. For example, the RI may be calculated in six non-overlapping ten second intervals for a period between sixty seconds to one hundred twenty seconds since the last crossing of TH1. If the RI is not greater than the third threshold TH3, then the room may be determined to remain in the occupied state. If the RI is greater than the third threshold TH3, then the process may check whether the change in amplitude remains less than the first threshold for a subsequent period. For example, the process may determine whether the change in amplitude has remained less than the threshold TH1 for one hundred eighty seconds since the last crossing of TH1. If the change in amplitude has not remained less than the threshold TH1 during the third period or checking, then the process may determine that the room has been vacated. Otherwise, if the process has determined that the change in amplitude did not remain less than the TH1 during the third period, then the process may determine that the room remains occupied and may reset the checking (loop to) to a first period for checking changes in amplitude again. While the foregoing was described in a process of checking over a three varying periods since the last crossing of the first threshold, it will be understood that the process may continue over more periods since the first crossing of the first threshold. In addition, the duration of the periods may be different than sixty seconds and the number of and duration of windows in each period may be different than what was described. In addition, the duration of periods may vary from each other.

Figure 6A:
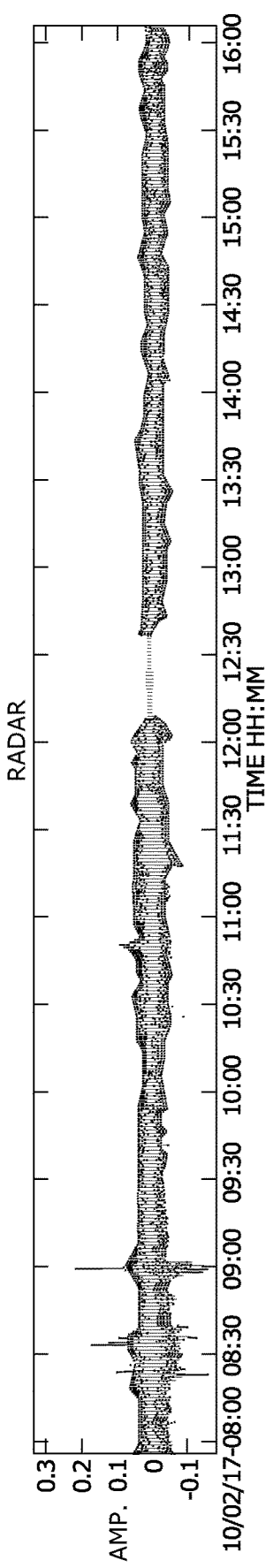
FIG. 6A is a plot of RADAR points obtained for a full day using embodiments of the subject technology.
Figure 6B:
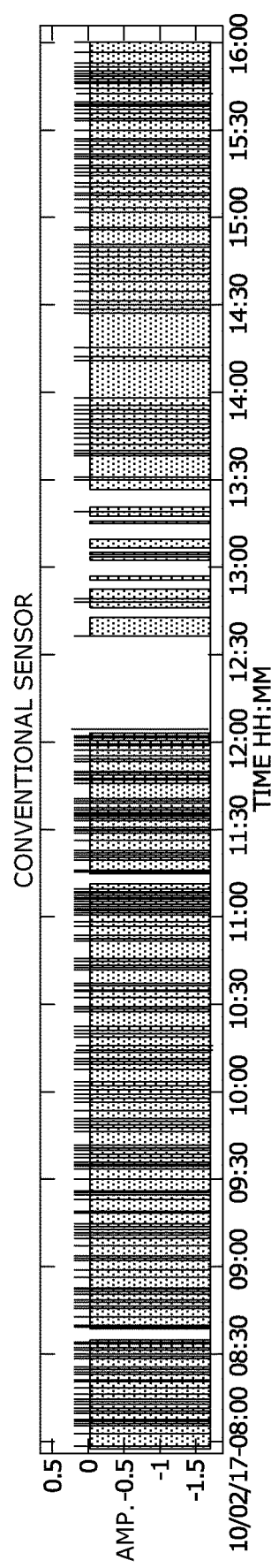
FIG. 6B is a plot of points obtained for a full day using a conventional sensor and system.
Figure 6C:
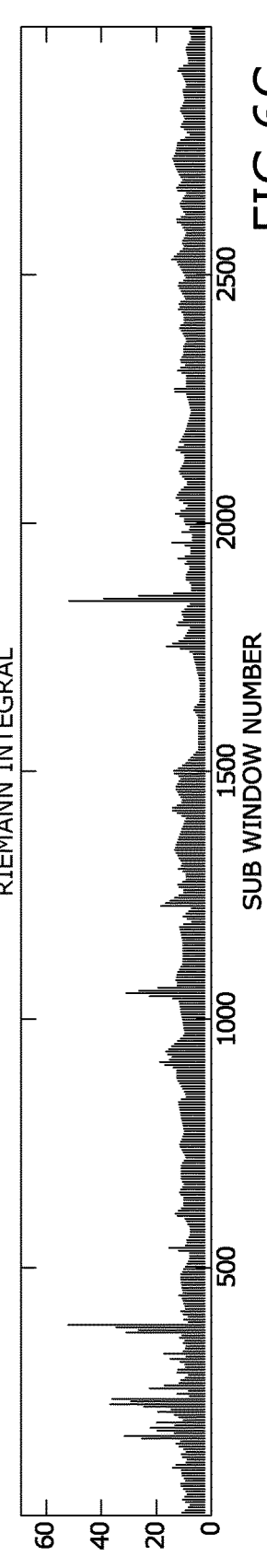
FIG. 6C is a plot of points of a Riemann integral calculation for the data of FIG. 6A.
Figure 7:
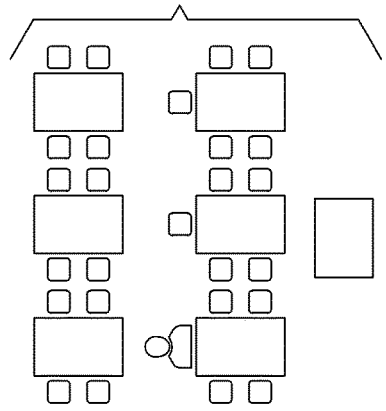
FIG. 7 is a schematic diagram of a classroom with a single person occupying a seat among multiple tables and unoccupied seats.
Figure 8A:
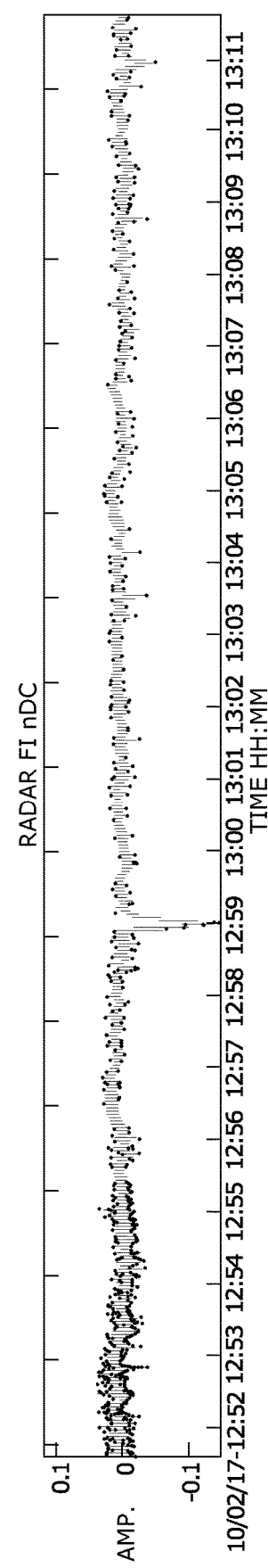
FIG. 8A is a plot of data generated in the environment of FIG. 7 by embodiments of the subject technology.
Figure 8B:
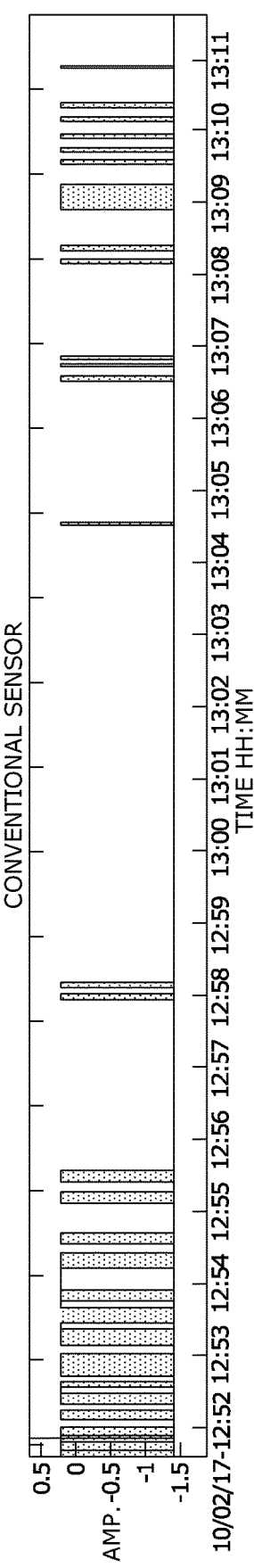
FIG. 8B is a plot of data generated in the environment of FIG. 7 by a conventional sensor system.

FIGS. 6A-6C shows performance results of using a Doppler radar sensor with the developed methods in comparison to a conventional PIR/Ultrasound sensor for occupancy detection in a classroom for one full recorded day. FIG. 6A shows the recorded radar data from 8:00 am in the morning till 4:00 pm in the afternoon. There is a recess at noon. The plot shows crossed threshold points (local maximum and minimums) which are represented by square shaped plot points. As can be seen, the plotted threshold crossings (local maximum and minimum points) are detected while the classroom is in session (occupied). However, no threshold points are crossed (this the absence of square plot points) during the recess period when the classroom is vacant. The FIG. 6B shows the output of the conventional sensor. FIG. 6C shows a calculated Riemann integral. While both of the hybrid sensor and Doppler radar sensor are able to detect large body movements or when the classroom is in session with multiple students, the superior performance of Doppler radar sensor is noticeable in cases with fewer occupants and less loco motion during recess time at noon. The detailed cases on the same day which Doppler radar sensor shows superior performance than conventional sensors are described as follows:

During the class recess time instructor is sitting for extended period of time (FIG. 7). Passive infrared picks up very large movements and fails to detect that the room is occupied most of the time while occupants are sedentary. An ultrasonic motion sensor has better performance but still has long lapses in coverage as can be seen in FIG. 8B from 12:58 pm to 1:04 pm. The system of the subject technology was able to continuously monitor the area as shown in FIG. 8A.

Ceiling fans are usually on in a classroom setting which may contribute to false detection of movement or may distort noise signals. FIGS. 9A and 9B show data for the situation when the classroom is empty, and fans are gradually turning off. FIG. 9B shows the results detected by a hybrid sensor system. The hybrid sensor detected a false occupancy as is seen at approximately 12:06. However, the system and processes of the subject technology not only correctly detect the empty room but also can calculate the fan rate and recognize non-human rate changes as is shown in FIG. 9A where the data never exceeds a threshold level. Additionally, the fan rate may be used as a factor when performing the adaptive threshold calculations for signals present in the room.

As may be appreciated, the output from the system and method on whether the room is occupied or vacant may be used as an input to environmental system controlling features in a room. This determination may be transmitted via a wired or wireless connection to a building management system, a HVAC system, a security system, a lighting system, a home automation system, plug load, or other system which would use the information to control the airflow in a variable-air-volume HVAC system, to turn lights on/off, to turn HVAC systems on/off, to set the temperature set-point for an HVAC system, to turn other electronics on/off, to provide security alerts, for hot-desking systems, or for other purposes. Alternatively, the data could be used offline to set controls or schedules for lighting or HVAC, for grid-interactive energy use decisions based on when spaces are typically occupied, to make real-estate decisions, or to obtain data to set other parameters or to make other decisions. As such, the significant improvement in the accuracy of the determinations of occupancy may result in significant savings to energy usage and may improve significantly on the inadvertent shutting off of loads while people are occupying a room, or may result in reduced real-estate costs, dependent on the applications.

Referring back to FIGS. 1, 2A, and 2B, the computing device 13 may be described in the general context of computer system executable instructions, such as program modules, being executed by a computer system. In some embodiments, the computing device 13 may be a local computing device providing stand-alone monitoring of a system or may be a cloud computing node remotely connected to the RADAR system 12 and to a cloud computing network (not shown). The computing device 13 may be practiced in distributed cloud computing environments where tasks are performed by remote processing devices that are linked through a communications network. In a distributed cloud computing environment, program modules may be located in both local and remote computer system storage media including memory storage devices.

The computing device 13 may typically include a variety of computer system readable media. Such media could be chosen from any available media that is accessible by the computing device 13, including non-transitory, volatile and non-volatile media, removable and non-removable media. The system memory could include random access memory (RAM) and/or a cache memory. A storage system can be provided for reading from and writing to a non-removable, non-volatile magnetic media device. The system memory may include at least one program product having a set (e.g., at least one) of program modules that are configured to carry out the functions of embodiments of the invention. The program product/utility, having a set (at least one) of program modules, may be stored in the system memory. The program modules generally carry out the functions and/or methodologies of embodiments of the invention as described above.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects Furthermore, aspects of the disclosed invention may take the form of a computer program product embodied in one or more computer readable media having computer readable program code embodied thereon.

Aspects of the disclosed invention are described above with reference to block diagrams and flowcharts of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processing unit of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. While not explicitly shown for sake of illustration, it should be understood that processing units are resident in the computing device 13 shown or in any computing device connected to the sensor system monitoring a room for occupancy.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A computer program product for detecting the presence of a person in a room, the computer program product comprising a non-transitory computer readable storage medium having computer readable program code embodied therewith, the computer readable program code being configured, when executed by a processing unit, to:
set a threshold level of a signal indicating body movement in the room;
receive a RADAR-based signal from a RADAR sensor in the room;
determine a Riemann integral (RI) value for a sampling of data from the RADAR-based signal;
determine over subsequent time windows of varying duration, whether the RI value exceeds the threshold level, wherein the threshold level varies in amplitude from one time window to another time window and a value for the threshold level decreases for subsequent time windows;
in the event the RI value exceeds the threshold level for a first time window or a subsequent time window, determine that the room is occupied and send a turn on signal to a controller to turn on an environmental load or maintain the environment load on in the room; and
in the event the RI value does not exceed the threshold level, determine that the room is vacant and send a turn off signal to the controller to turn off the environmental load.

2. The computer program product of claim 1, further comprising program code configured to:
schedule to determine over a second time window, whether the RI value exceeds the threshold level, in response to the determination that the room is occupied.

3. The computer program product of claim 2, wherein the threshold level is based on an adaptive thresholding wherein an updated threshold calculation is performed between a first time window and the second time window.

4. The computer program product of claim 3 wherein the updated threshold calculation is based on a peak to peak comparison of the sampling of data from the RADAR-based signal in the second time window.

5. The computer program product of claim 1, further comprising program code configured to:
determine whether there is a presence of body movement in the room by calculating a difference between a current signal amplitude to a previous local minimum or a previous local maximum value and comparing the difference to a second threshold level.

6. A method for detecting the presence of a person in a room, comprising:
setting a baseline value for an adaptive threshold level of a signal indicating body movement in the room;
receiving a RADAR based signal from a RADAR sensor in the room;
determining a Riemann integral (RI) value for a sampling of measurement data from the RADAR-based signal;
determining whether the RI value over a first time window exceeds the adaptive threshold level;

in the event the RI value exceeds the adaptive threshold level, determining that the room is occupied and sending a turn on signal to a controller to turn on an environmental load or maintaining the environment load on in the room;

in the event the RI value does not exceed the adaptive threshold level, determining that the room is vacant and sending a turn off signal to the controller to turn off the environmental load; and adjusting the adaptive threshold level over time, based on using an average of the measurement and a standard deviation of values of the measurement data obtained from measurements taken over subsequent time windows of varying duration in a vacant room until the adaptive threshold level is crossed, indicating that the room is occupied.

7. The method of claim 6, wherein the adaptive threshold level is based on an adaptive thresholding wherein an updated threshold calculation is performed between the first time window and a second time window.

8. The method of claim 7, wherein the updated threshold calculation is based on a peak to peak comparison of the sampling of data from the RADAR-based signal in the second time window.

9. The method of claim 6, further comprising determining whether there is a presence of body movement in the room by calculating a difference between a current signal amplitude to a previous local minimum or a previous local maximum value and comparing the difference to a second threshold level.

* * * * *